Sept. 1, 1964 W. G. EHRICH 3,147,340

COLOR TELEVISION RECEIVER SYSTEM

Filed Aug. 28, 1953 6 Sheets-Sheet 1

INVENTOR.
WILLIAM G. EHRICH

BY

ATTORNEY

Sept. 1, 1964 W. G. EHRICH 3,147,340

COLOR TELEVISION RECEIVER SYSTEM

Filed Aug. 28, 1953 6 Sheets-Sheet 2

INVENTOR.
WILLIAM G. EHRICH

BY

Allen V. Hazeltine

ATTORNEY

COLOR TELEVISION RECEIVER SYSTEM

Filed Aug. 28, 1953 6 Sheets-Sheet 3

INVENTOR.
WILLIAM G. EHRICH
BY
Allen V. Hazeltine
ATTORNEY

Sept. 1, 1964 W. G. EHRICH 3,147,340

COLOR TELEVISION RECEIVER SYSTEM

Filed Aug. 28, 1953 6 Sheets-Sheet 4

INVENTOR.
WILLIAM G. EHRICH
BY
Allen V. Hazeltine
ATTORNEY

INVENTOR.
WILLIAM G. EHRICH
BY
Allen V. Hazeltine
ATTORNEY

Sept. 1, 1964 W. G. EHRICH 3,147,340

COLOR TELEVISION RECEIVER SYSTEM

Filed Aug. 28, 1953 6 Sheets-Sheet 6

INVENTOR.
WILLIAM G. EHRICH
BY
Allen V. Hazeltine
ATTORNEY

United States Patent Office 3,147,340

Patented Sept. 1, 1964

3,147,340

COLOR TELEVISION RECEIVER SYSTEM

William G. Ehrich, Barrington, N.J., assignor to Philco Corporation, Philadelphia, Pa., a corporation of Pennsylvania Filed Aug. 28, 1953, Ser. No. 377,075
21 Claims. (Cl. 178—5.4)

The present invention relates to electrical systems and more particularly, to cathode-ray tube systems for producing a color television image.

In one form, cathode-ray tubes for producing a color television image may comprise an electron responsive image screen made up of a plurality of parallel stripes of fluorescent material arranged on a suitable base such as the faceplate of the tube. The stripes may be arranged in a repetitive sequence so as to form consecutive groups of stripes, each adapted to produce light of the different primary colors.

For reasons which will become apparent from the following remarks, the invention is particularly applicable to cathode-ray color image reproducing systems in which the stripes of fluorescent material are oriented substantially horizontally, and the invention will be described in connection with such cathode-ray tube systems. However, it should be well understood that the invention is also applicable to cathode-ray tube systems in which the stripes are oriented either vertically or at an angle to the horizontal.

In accordance with present practice the image screen is scanned rectilinearly in a horizontal direction at the rate of 15,750 times per second and in a vertical direction at the rate of 60 times per second. The horizontal scansions are interlaced in a 2 to 1 ratio so that a complete image is formed during two vertical scansions of the image screen and the images so produced are repeated at the rate of 30 times per second. Under these scanning conditions approximately 525 horizontal scanning lines are theoretically available for reproducing the desired image. However, because of the time consumed by the vertical retrace periods, the number of horizontal scanning lines actually available for producing the desired image is reduced to approximately 490.

To achieve a desired degree of definition comparable to that now commonly available in so-called black and white image reproducers, the color image screen should contain a relatively large number of groups of fluorescent stripes. In the case of a cathode-ray tube having a screen in which the stripes are oriented vertically, the number of groups should approximate the number of picture elements contained in one line scan of the reproduced image—i.e. the image screen should contain approximately 400 groups of stripes. Similarly, in the case of a cathode-ray tube having a screen in which the stripes are oriented horizontally, the number of groups of stripes should be at least equal to the number of horizontal scanning lines actually available for producing the desired image—i.e. the image screen should contain approximately 490 groups of stripes.

In a typical case, a so-called 20″ cathode-ray tube may have a picture area 16″ wide and 12″ high. Accordingly, in the case of a cathode-ray tube system in which the stripes are arranged vertically, each group of stripes must be restricted to a maximum width of approximately .04″ in order to accommodate 400 groups of stripes on the image screen. If we assume that each group of stripes is to consist of a red producing stripe, a green producing stripe and a blue producing stripe, it will be seen that each stripe must be restricted to a maximum width of approximately .01″. In the case of a cathode-ray tube in which the stripes are oriented horizontally, each group of stripes must be restricted to a maximum width of approximately .025″ in order to accommodate 490 groups of stripes on the image screen, and in this latter construction each stripe must be restricted to a maximum width of approximately .008″. In practice it is desirable to space the individual stripes of fluorescent material by a small amount from the adjacent stripes to avoid intermixing of the phosphors at their edges so that, in the case of a cathode-ray tube system in which the stripes are oriented horizontally, the maximum permissible width of the stripes may be less than the above noted value, and may approach .005″.

In order to achieve satisfactory color reproduction, the width of the spot formed by the cathode-ray beam at its point of impingement on the screen surface should be limited to the maximum width of the phosphor stripe. When the fluorescent stripes have dimensions of the order above noted, this is most readily achieved by reducing the beam current to a relatively small value. However, when this is done, the brightness of the reproduced image is correspondingly impaired. The alternative heretofore available has been to increase the width of the fluorescent stripe. While this expedient permits the use of a beam of greater current intensity and a larger spot size, so that the desired color rendition may be achieved without sacrificing the brightness of the image produced, these advantages have been obtained at the expense of the resolution of the image since it is then no longer possible to physically contain on the screen surface the number of groups of stripes needed to reproduce all of the detail supplied by the received color video signal.

It is an object of the invention to provide improved cathode-ray color television image reproducing systems.

A further object of the invention is to provide a cathode-ray color television system adapted to produce an image having improved definition, brightness and color.

Another object of the invention is to provide a cathode-ray color image reproducing system of the type in which the image screen comprises a plurality of stripes of material adapted to produce light of different colors and in which the said stripes are arranged in a repetitive pattern to form a plurality of consecutive groups.

A further object of the invention is to provide a cathode-ray tube system of the aforesaid type in which a small number of groups of fluorescent stripes are made to resolve a relatively large number of image elements.

A specific object of the invention is to provide a color television image reproducing cathode-ray tube system of the foregoing type in which the image produced is characterized by full vertical definition, by accurate color rendition and by enhanced brightness.

Further objects of the invention will appear as the specification progresses.

The invention is based on the findings that when adjacently arranged stripes of material producing different colors are energized, the light produced therefrom appears subjectively to derive from an effective center of luminance which is contained within the bounds of the stripes and has a position as determined by the relative spectral responses of the eye to the various colors of the emitted light. Furthermore, by rearranging the pattern of the colors produced by energizing the stripes, these effective centers of luminance may be shifted in position. In accordance with these findings, the foregoing objects are achieved by so constructing the image screen and by so energizing the same that, during a first given scansion of the image screen substantially parallel to the fluorescent stripes contained thereon, a first group of effective centers of luminescence spaced apart are produced by the phosphor stripes, and, during a second given scansion of the image screen substantially parallel to the fluorescent stripes, a second group of effective centers of luminance interlaced with the first group are produced.

More specifically, and in a preferred form of the invention, the image screen is provided with one-half the number of groups of fluorescent stripes normally necessary to produce full vertical definition in the reproduced image. During the odd field scanning periods, the stripes of the consecutive groups are effectively arranged in a first given pattern and produce a first group of spaced effective centers of luminance. During the even-field scanning periods the stripes of the consecutive groups are effectively rearranged in a second given pattern by the expedient of energizing as a group the confronting stripes of the first groups thereby to produce a second group of spaced effective centers of luminance interlaced with the centers of luminance produced during the odd-field scanning period.

The invention will be described in greater detail with reference to the appended drawings forming part of the specification and in which.

Figure 1:
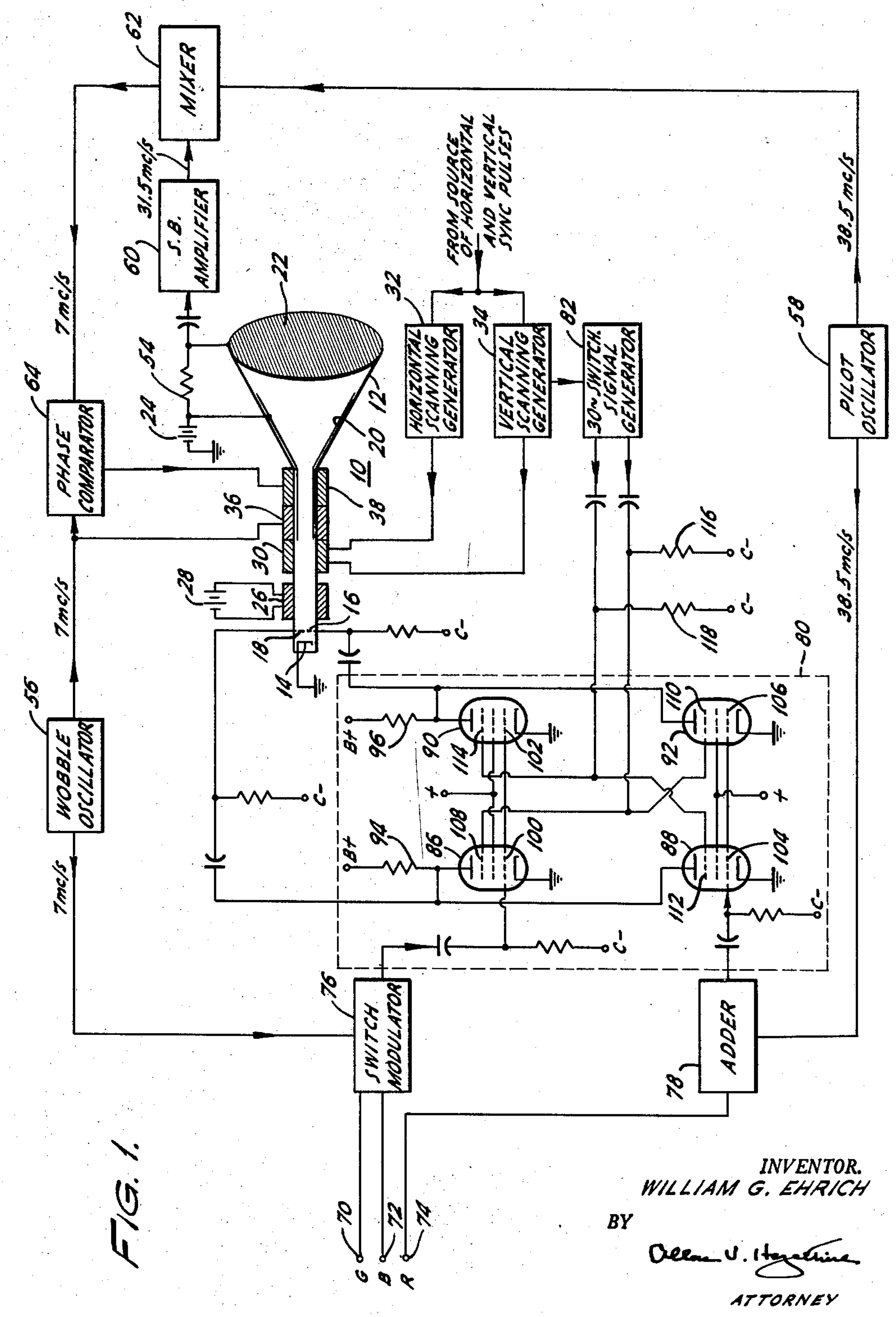
FIGURE 1 is a block diagram, partly schematic, showing one form of a cathode-ray tube system in accordance with the invention.

Referring to FIGURE 1, the color television image reproducing system there shown, comprises a cathode-ray tube 10 containing, within an evacuated envelope 12, a dual beam generating and intensity control system comprising a cathode 14, control electrodes 16 and 18 and an accelerating anode 20, the latter of which may consist of a conductive coating on the inner wall of the envelope and which terminates at a point spaced from the end face 22 of the tube 10 in conformity with well established practice. Suitable forms of construction for the dual beam generating system have been described in the copending application of W. L. Fite et al., Serial No. 307,868, filed September 4, 1952, now U.S. Patent No. 2,712,087, and a further description thereof herein is believed to be unnecessary. Electrodes 16 and 18 are maintained at their desired operating bias potentials by being connected to appropriate voltage sources indicated at C— through respective grid resistors, whereas electrode 20 is operated at the desired beam accelerating potential by a suitable voltage source shown as a battery 24. For focusing the beams there is provided a conventional focusing yoke 26 energized by an appropriate current source shown as a battery 28.

A deflection yoke 30, coupled to horizontal and vertical scanning generators 32 and 34, respectively, of conventional design, is provided for deflecting the dual electron beams across the faceplate 24 to form a raster thereon. Additionally, there are provided two auxiliary yokes 36 and 38 adapted to deflect the beams in a vertical direction and for purposes later to be discussed in detail.

Figures 2, 3:
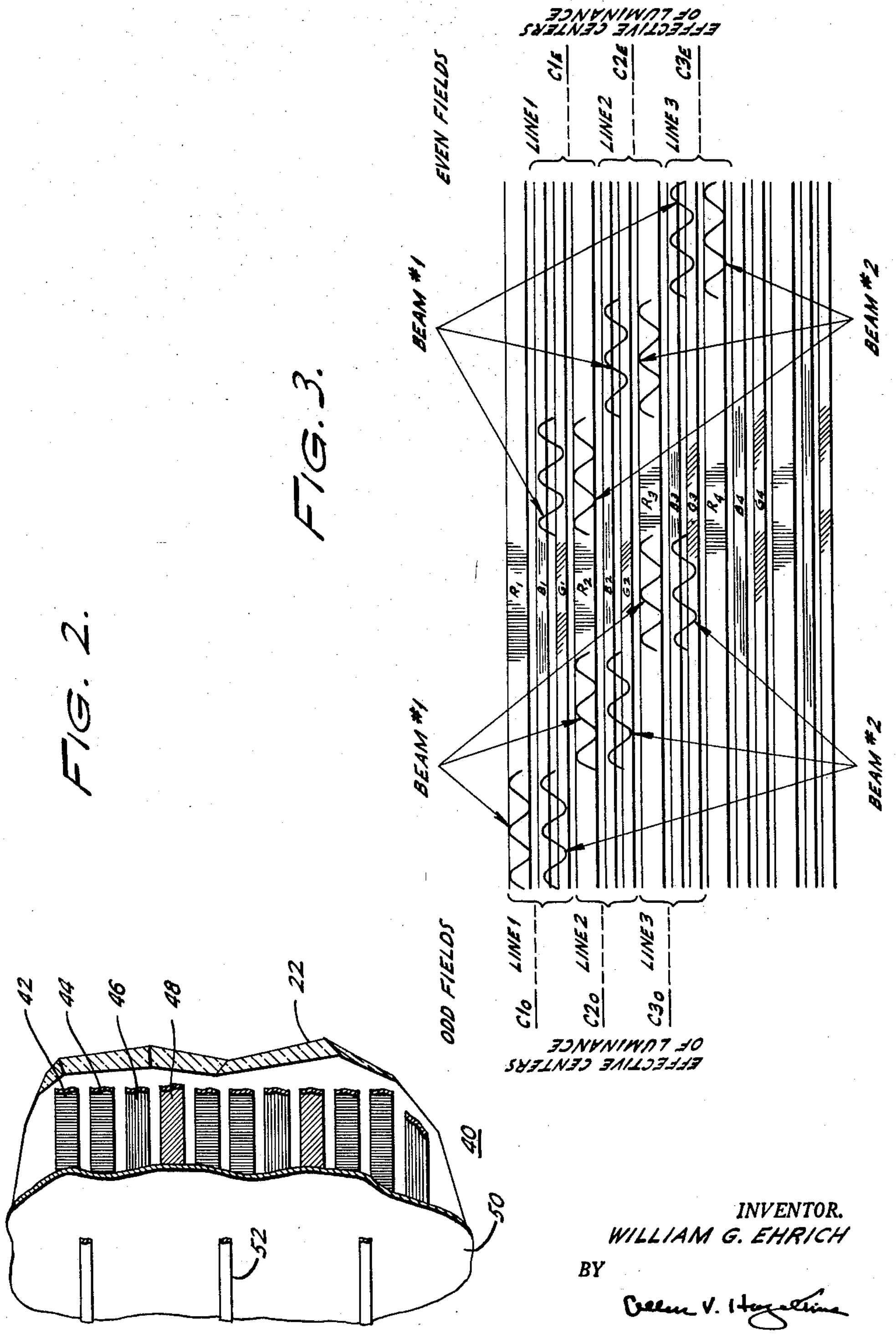
FIGURE 2 is a perspective view, partly cut away, showing a portion of one form of a beam intercepting structure for a cathode-ray tube image reproducer suitable for use in the system of FIGURE 1.
FIGURE 3 is a diagrammatic representation of the image screen of the system of FIGURE 1 showing one form of scanning pattern in accordance with the invention.

The faceplate 22 of the tube 10 is provided with an image forming screen structure, one suitable form of which is shown as 40 in FIGURE 2. The structure 40 comprises a plurality of parallelly arranged stripes 42, 44, 46 and 48 of phosphor materials which, upon electron impingement, fluoresce to produce light of three different primary colors. For example, the stripes 42 and 44 may consist of a phosphor such as zinc phosphate containing manganese as an activator, which upon electron impingement produce red light; the strips 46 may consist of a phosphor such as calcium magnesium silicate containing titanium as an activator, which produces blue light; and the stripe 48 may consist of a phosphor such as zinc orthosilicate which produces green light. Other suitable materials which may be used to form the stripes 42, 44, 46 and 48 are well known to those skilled in the art, as well as methods of applying the same to the faceplate 22, and further details herein concerning the same are believed to be unnecessary.

The structure 40 further serves for producing an indexing signal indicative of the position of the cathode-ray beams on the image screen. In the arrangement shown, the indexing signal is produced by utilizing indexing stripes of a material having a secondary-electron emission ratio detectably different from the secondary electron emission ratio of the remainder of the screen structure. For this purpose, the structure 40 further comprises a thin electron permeable conducting layer 50 of low secondary emissivity and stripes 52 of a material having a relatively high secondary emissivity. The layer 50 is arranged on the phosphor stripes and preferably further constitutes a mirror for reflecting light generated at the phosphor stripes. In practice the layer 50 is a light reflecting aluminum coating which is formed in well known manner. It should be well understood that other metals capable of forming a coating in the manner similar to aluminum, and having a secondary-electron emissivity detectably different from that of the material of the indexing stripes 52, may also be used. Such other metals may be, for example, magnesium or beryllium.

The indexing stripes 52 may consist of magnesium oxide, or may consist of a high atomic number metal such as gold, platinum or tungsten. As shown, these stripes are arranged on the coating 50 centrally positioned with respect to adjacent pairs of the red phosphor stripes 42 and 44.

The beam intercepting structure so constituted is connected to the positive pole of the batery 24 through a load impedance 54 by means of a suitable connection to the conductive coating 50 thereof.

The beam intercepting screen structure 40 is arranged within the tube 10 with the phosphor and indexing stripes thereof extending substantially horizontally—i.e. substantially parallel to the horizontal scanning direction—and the beam generating system is so oriented that the points of impingement of the beams on the screen structure are disposed in a line transverse and preferably at right angles to the direction of the stripes.

By means of the deflection yoke 30, energized by the horizontal and vertical scanning generator 32 and 34 respectively, the dual electron beams are simultaneously deflected across the screen structure 40 in conventional manner. In addition, by means of the yoke 36, the beams are further deflected in the vertical direction so that, during each line scanning period, each beam alternately impinges on one or another of two of the phosphor stripes—i.e. one beam is made to impinge alternately on the red stripe 42 and the red stripe 44, and the other beam is made to impinge alternately on the blue stripe 46 and the green stripe 48.

This auxiliary vertical deflection of the beams may take any of several forms. For example, the deflection movement may have a rectangular pulse form whereby each beam rests on one phosphor stripe of the pair for a given interval and thereafter is deflected to the other phosphor stripe for the remainder of the interval. In the form most simply realized, the auxiliary vertical deflection is sinusoidal so that, during each horizontal scanning period, the beam undulate between the paired phosphor stripes. For producing this auxiliary deflection of the beams, there is provided an oscillator 56 which typically may operate at a frequency of 7 mc./sec. and which energizes the auxiliary vertical deflection yoke 36.

The auxiliary vertical deflection of one of the beams between the red phosphor stripes 42 and 44 causes this beam to similarly scan the associated indexing stripe 52 (see FIGURE 2) and thereby produce across the load impedance 54 an indexing signal having variations indicative of departures of the center of movement of the beam about the indexing stripe. This indexing signal may be used to control the vertical position of the beams so that the movements of the beams are confined to a given group of phosphor stripes during each horizontal line scanning period notwithstanding non-linearities of the deflection signal produced by the vertical scanning generator 34. Preferably, this indexing signal is generated in accordance with the principles described in the copending application of R. C. Moore, Serial No. 370,299, filed July 27, 1953, now U.S. Patent No. 2,773,118, issued December 4, 1956. More particularly, the beam serving to scan the red phosphor stripes 42 and 44 and the indexing stripe 52 is subjected to intensity variations by means of a pilot carrier oscillator 58, as discussed for fully hereinafter, and thereby generates across the load impedance 54 an indexing signal comprising intermodulation products as determined by the pilot carrier, by the rate at which the beam transversely scans the indexing strip, and by the symmetry of the auxiliary scanning movement of the beam transverse to the index stripe. More particularly, when the beam impinging the index stripe is intensity modulated by means of a pilot carrier as aforesaid, there is produced across the load impedance 54 an indexing signal comprising bursts of the pilot carrier recurring in synchronism with the scanning of the indexing stripes and at a frequency equal to twice the auxiliary scanning rate of the index stripe. These bursts will be spaced at uniform time intervals when the beam movement is exactly centered about the axis of the indexing stripe, or will be grouped in pairs in accordance with one pattern when the center of beam movement is above the axis of the indexing stripe, and in accordance with a second pattern when the center of beam movement is below the axis of the indexing stripe. Accordingly, the signal produced across load impedance 54 will exhibit no sideband components which are equal to the sum or difference between the frequency of the pilot carrier and the frequency of the auxiliary vertical deflection when the beam movement is exactly centered about the axis of the index stripe and will exhibit such sidebands when the beam is not centered. These sidebands will have a phase as determined by the position of the beam relative to the indexing stripe so that, when the center of movement of the beam is above the axis of the index stripe, the upper and lower sidebands will have given phases, and, when the center of beam movement is below the axis of the index stripe, the upper and lower sidebands will have phases opposite to those of the first condition. Since the position of the beam may be established by either sideband, only one of the sidebands is necessary to supply the desired indexing information. In the arrangement specifically shown in FIGURE 1, in which the oscillator 56 operates at a frequency of 7 mc./sec. and the pilot oscillator 58 operates at a frequency of 38.5 mc./sec., the lower sideband at approximately 31.5 mc./sec. is used for supplying the desired indexing information and this sideband component is preferentially selected from the remaining signal components generated across load impedance 54 by means of a sideband amplifier 60 having a restricted pass band characteristic centered about this nominal frequency value. Amplifier 60 may be conventional in form and may be made to exhibit a restricted pass band characteristic in any well known manner, for example by means of a resonant circuit broadly tuned to the frequency of the desired sideband or by an equivalent filter system.

The output of the amplifier 60 is supplied to a heterodyne mixer 62, to which is also supplied a signal from the pilot oscillator 58, thereby to convert the 31.5 mc./sec. signal to an output signal at a frequency of 7 mc./sec. This output signal exhibits a phase and amplitude as determined by the phase and amplitude of the applied 31.5 mc./sec. input signal, and hence as determined by the sense and the amount of the departure of the beam impinging the index stripe from its center position. Mixer 62 may be of conventional form and may consist of a dual grid thermionic tube to the different grids of which the two input signals are supplied. The output circuit of the mixer may additionally include a resonant circuit broadly tuned to the frequency of the desired 7 mc./sec. signal.

The 7 mc./sec. indexing signal so produced is supplied to a phase comparator 64 to which is also supplied a signal at 7 mc./sec. from the oscillator 56. Phase comparator 64 may be conventional in form and may consist for example of a bridge, two arms of which are made up of diode elements which are energized in phase opposition by one of the input signals and in the same phase sense by the other of the input signals. In one form, the phase comparator may be of the type described by R. H. Dishington in the publication "Proceedings of the I.R.E." December, 1949, at page 1401 et seq. The output signal of the phase comparator 64 will have a polarity and amplitude as determined by the phase and amplitude of the signal derived from the mixer 62 and this output signal may be used for maintaining the index-producing beam centered on the index stripes 52 of the image producing structure by supplying the same to the auxiliary vertical deflection yoke 38. Alternatively, as will be readily apparent to those skilled in the art, the output signal of the phase comparator may be applied to the vertical scanning generator 34, thereby to vary the deflection signal produced and maintain the desired registration of the beams.

Thus far there has been described a cathode-ray image reproducing system in which the televised image is reproduced by means of a screen structure having horizontally disposed fluorescent stripes which are energized by two cathode-ray beams so arranged that one of the beams excites the fluorescent material producing one primary color component of the image and the other beam excites the fluorescent materials producing two other primary color components of the image. In addition it has been shown how these beams may be maintained in proper registration with the fluorescent stripes of the image screen during each line scanning period so that proper color rendition may be effected.

As pointed out above, in order to achieve the desired image resolution it has heretofore been necessary to construct the image screen structure with one group of phosphor stripes for each image element to be reproduced in a given scanning direction. Thus, when using a cathode-ray image reproducing system in which the phosphor stripes of the image screen are oriented horizontally as in the case of the system of FIGURES 1 and 2, it has heretofore been necessary to construct the screen with approximately 490 groups of the stripes producing the three different primary colors in order to achieve the desired vertical resolution in the reproduced image. Because of the limited space available on the faceplate of the image reproducer this number of groups of fluorescent stripes could be provided only by restricting the width of the stripes to such an extent that the stripe width becomes less than the spot size of a beam of an intensity sufficient to produce an image of the desired brightness.

The present invention provides novel arrangements by means of which the requirement for constructing the image screen as above described is circumvented, whereby a substantially smaller number of groups of stripes may serve to produce all of the desired image resolution.

More particularly the invention is based on the finding that, due to the characteristics of the human eye, the light emitted by three closely positioned sources of primary colors appears to arise from a center of luminance, the position of which is established by the relative positions of the primary color sources and by the spectral response of the eye to the different primary colors. Accordingly, by scanning the phosphor stripes producing the three primary colors in one group arrangement during one field scanning period and by scanning the phosphor stripes in a different group arrangement during a succeeding field scanning period, the effective centers of luminance produced during the alternate scanning fields may be made to shift relative to each. By so shifting the effective centers of luminance during alternate field scanning periods, the centers of image detail are effectively interlaced insofar as the visual observer can discern, with the result that the number of groups of phosphor stripes needed to produce the desired vertical resolution is reduced to one-half the number of groups normally required, and correspondingly the permissible width of the phosphor stripes for a given size of the image screen is doubled.

The manner in which this interlacing is brought about in accordance with the embodiment of the invention shown in FIGURE 1 is illustrated in FIGURE 3. As appears from FIGURE 3, during line 1 of the odd scanning field, beam No. 1 scans the red phosphor stripe $R_1$ and simultaneously beam No. 2 scans the blue and green phosphor stripes $B_1$ and $G_1$ respectively. The energization of this group of phosphor stripes brings about an effective center of luminance which, for the stripe arrangement shown, is effectively in the middle of the group of stripes as shown at $C1_0$. Similarly, during scanning line 2 of the odd field, beams 1 and 2 scan the phosphor stripes $R_2$, $B_2$ and $G_2$, and, to the visual observer, the light produced by the scanning of this group of stripes appears to originate from a center of luminance shown as $C2_0$. This scanning action is continued throughout the remainder of the odd field scanning period so that effective centers of luminance $C3_0$ etc. are produced. In the case of a televised image transmitted in accordance with present standards, where the image is made up of approximately 490 horizontal lines interlaced 2:1 so that each field is made up of approximately 245 lines, the scanning of the image screen as above described produces, during the odd field scanning period, 245 effective centers of luminance.

In order to shift the effective centers of luminance, the groups of fluorescent lines are effectively rearranged in a different order during the even scanning field periods. More particularly, and as shown in the right hand portion of FIGURE 3, during line 1 of the even field scanning period beam 1 energizes the blue and green phosphor stripes $B_1$ and $G_1$ respectively and beam 2 energizes the red phosphor stripe $R_2$. Thus, during line 1 of the even field scanning period, the group of phosphor stripes scanned by the beams is constituted by the phosphor stripes $B_1$, $G_1$ and $R_2$. The light emitted by this group of stripes has an effective center of luminance as shown at $C1_E$. During line 2 of the even scanning field the stripes $B_2$, $G_2$ and $R_3$ are scanned and produce an effective center of luminance as shown at $C2_E$. Successive even field scanning lines correspondingly produce effective centers of luminance $C3_E$ etc. It will be noted that, as illustrated, the centers of luminance $C1_E$, $C2_E$, $C3_E$ etc are displaced relative to the centers of luminance $C1_0$, $C2_0$, $C3_0$ etc, the centers of luminance produced during the even field scanning periods being arranged approximately midway between the centers of luminance produced during the odd field scanning periods.

For energizing the two beams of the cathode-ray tube 10 to produce the above described mode of scanning, the system of FIGURE 1 further comprises input terminals 70, 72 and 74, a switching modulator 76, an adder 78, a beam signal switching system 80, and a switching signal generator 82. The input terminals 70, 72 and 74 are supplied from a receiver (not shown) with separate signals indicative of the green, blue and red components of the televised scene respectively.

The blue and green signals are supplied to the switching modulator 76 which alternately connects the input circuits to the output circuit thereof at a rate determined by an applied 7 mc./sec. signal derived from the oscillator 56. Accordingly there is produced at the output of the modulator a multiplexed signal which, during alternate periods thereof, represents the image information supplied by the green and blue input terminals 70 and 72.

The switching modulator 76 may be conventional in form and may consist, for example, of two dual grid thermionic tubes having their anodes connected in common. The green signal is supplied to one grid of one of the tubes and the blue signal is supplied to the corresponding grid of the other tube. The tubes are maintained normally in cut-off condition by an appropriate bias voltage applied to the second grids thereof and are rendered alternately conductive by supplying the said other grids with the said 7 mc./sec. signal from the oscillator 56, such excitation of the second grids being effected in phase opposition.

The red signal at terminal 74 is supplied to the adder 78 together with a pilot carrier signal derived from the oscillator 58 to produce an output signal comprising both of these input components. The adder 78 may take any well known form and may consist, for example, of two triodes having a common load impedance, the grid of one triode being connected to the input terminals 74 and the grid of the other triode being connected to the oscillator 58.

It is thus seen that, by means of the modulator 76 and the adder 78, there are produced two signals, one of which is made up of the green and blue image information arranged in multiplex sequence and the other of which is made up of the red information and the pilot carrier signal. These two signals are supplied to the control electrodes 16 and 18 of the tube 10 in alternate order for periods equal to the field scanning period by means of the beam signal switching system 80. In the form shown, the system 80 comprises four multigrid thermionic tubes 86, 88, 90 and 92. Tubes 86 and 88 have their anodes connected to a voltage source B+ through a common load impedance 94 whereas tubes 90 and 92 have their anodes connected to the source B+ through a common load impedance 96. The grids 100 and 102 of the tubes 86 and 90 are connected together and supplied with the signal at the output of the switching modulator 76, and the grids 104 and 106 are similarly connected together and supplied with the signal at the output of adder 78. Suitable biasing potentials may be applied to the aforementioned grids from the sources C− through appropriate grid resistors as shown. The tubes are additionally interconnected by means of their second control grids, the grid 108 of tube 86 and the grid 110 of tube 92 being connected in common and being supplied with one output signal from the signal switching generator 82. Similarly the grid 112 of tube 88 and the grid 114 of tube 90 are connected in common and supplied with a second output signal from the generator 82, this second output signal being in phase opposition to the first mentioned output signal. The tubes are maintained in a normal non-conducting condition and this may be effected by appropriate bias voltages supplied to the latter grids of the tubes through grid resistors 114 and 116 as shown.

The switching signal generator 82 may typically consist of a symmetrical multivibrator synchronized at 30 cycles/sec. by a signal from the vertical scanning generator 34 and is adapted to produce two square wave signals of opposite polarity at the output terminals thereof. Synchronized symmetrical multivibrators of this type are well known in the art and are typically shown in the publication "Theory and Applications of Electron Tubes" by H. J. Reich, published by McGraw-Hill Book Co. Inc., New York, 1939, at pages 355 and 359 thereof.

The system operates to supply the output signal of the switching modulator 76 to the control electrode 18, and the output signal of adder 78 to the control electrode 16 during one field scanning period, and to reverse these connections during the subsequent field scanning period, so that the relationship of the image information contained on the beams as shown in FIGURE 3 is achieved. This is effected by rendering the tubes 86 and 92 conductive during the first field scanning period by applying a positive going signal to the grids 108 and 110 during this period, at which time the tubes 88 and 90 are held non-conductive by reason of the cut-off bias applied thereto and/or by reason of the negative pulse applied to grids 112 and 114 during this period. During the subsequent field scanning period, at which time the polarity of the signals from the generator 82 is reversed, the tubes 88 and 90 are made conductive and tubes 86 and 92 are cut-off so that the signal from modulator 76 is applied to electrode 16 of tube 10 and the signal from the adder 78 is applied to electrode 18.

It will be apparent that, instead of switching the signals applied to electrodes 16 and 18 during consecutive field scanning periods to produce the luminance interlacing pattern shown in FIGURE 3, the relative positions of the beams may be reversed i.e. during the odd field scanning period beam No. 1 may be positioned above beam No. 2 and during the even field scanning period beam No. 1 may be positioned below beam No. 2. This may be effected in accordance with the embodiment of the invention shown in FIGURE 4.

Figure 4:
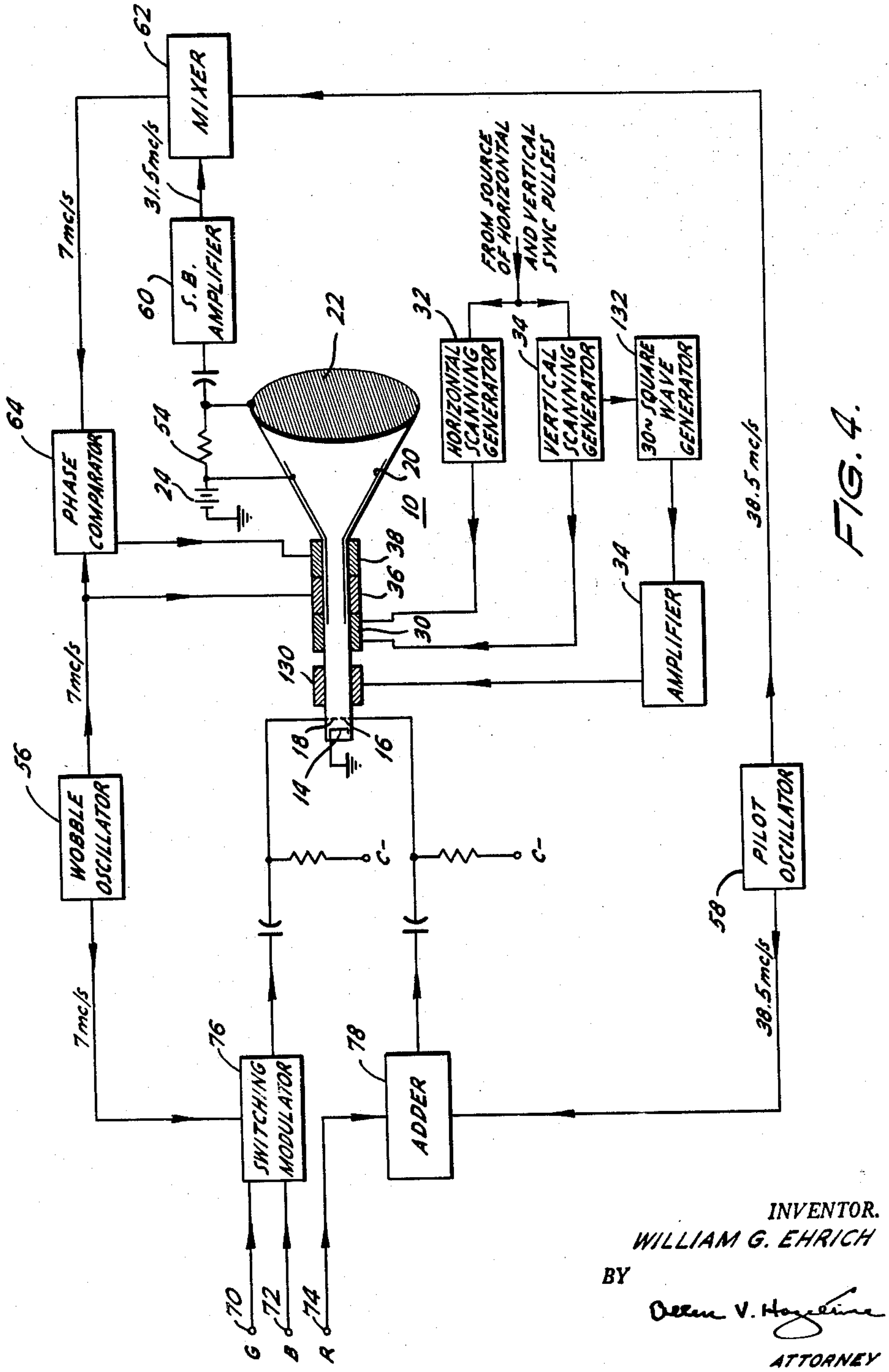
FIGURE 4 is a block diagram, partly schematic, showing another form of a cathode ray-tube system in accordance with the invention.

In FIGURE 4 those components of the system shown, which are similar to the corresponding components of the system of FIGURE 1, have been indicated by the same numerals. In addition, and for the sake of conciseness, only the differences in the system of FIGURE 4 pertinent to the operation of this modification of the invention will be pointed out. More particularly, in the embodiment shown, the output signal of the switching modulator 76 is supplied continuously to the control electrode 18 of tube 10, and similarly the output of adder 78 is supplied continuously to the control electrode 16.

The embodiment of the invention shown makes use of the well known principle that an electron beam passing through a focusing field is helically rotated by an amount determined by the geometry of the focusing field, and that the direction of rotation is determined by the direction of the magnetic field. Accordingly, when two beams are passed through the focusing field, they will be rotated relative to each other in one direction when the magnetic field has one direction and will be rotated in the opposite direction upon reversal of the direction of the magnetic field. By appropriately adjusting the direction of the plane of the beams emanating from the gun assembly relative to the direction of the phosphor lines—i.e. by generating the beams in a horizontal plane—the beams may be rotated clockwise relative to each other by energizing the focusing field in one sense and may be rotated counterclockwise relative to each other by energizing the focusing field in the opposite sense. In conformity with the foregoing, the system of FIGURE 4 comprises a focusing yoke 130 which is alternately energized in opposite senses during the consecutive field scanning periods by a focusing current derived from a synchronized switching signal generator 132 similar to the generator 82 of the system of FIGURE 1. An amplifier 134 of conventional form may be interposed between the focusing coil 130 and the generator 132 to supply the appropriate value of focusing current.

The remainder of the system shown in FIGURE 4 operates in the same manner as the system of FIGURE 1 and a further description thereof is believed to be unnecessary.

It is apparent that, while the red phosphor stripes 42 and 44 have been shown to be separate, these stripes may in practice be constituted by a single stripe. Nor is it necessary to provide the spaces shown between the stripes producing the different primary colors and these stripes may be contiguous if desired. It is also apparent that the electromagnetic focusing system of the system of FIGURE 1 may be replaced by an equivalent electrostatic focusing system, and that the electromagnetic beam rotating system specifically shown in FIGURE 4 may be replaced by other forms of systems, such as an auxiliary deflection system operating on the beams selectively, to reverse their relative positions during the successive field scanning periods. Similarly, whereas the deflection yokes 30, 36 and 38 have been described as separate components, these elements may in fact be combined into a unitary structure.

Figure 5:
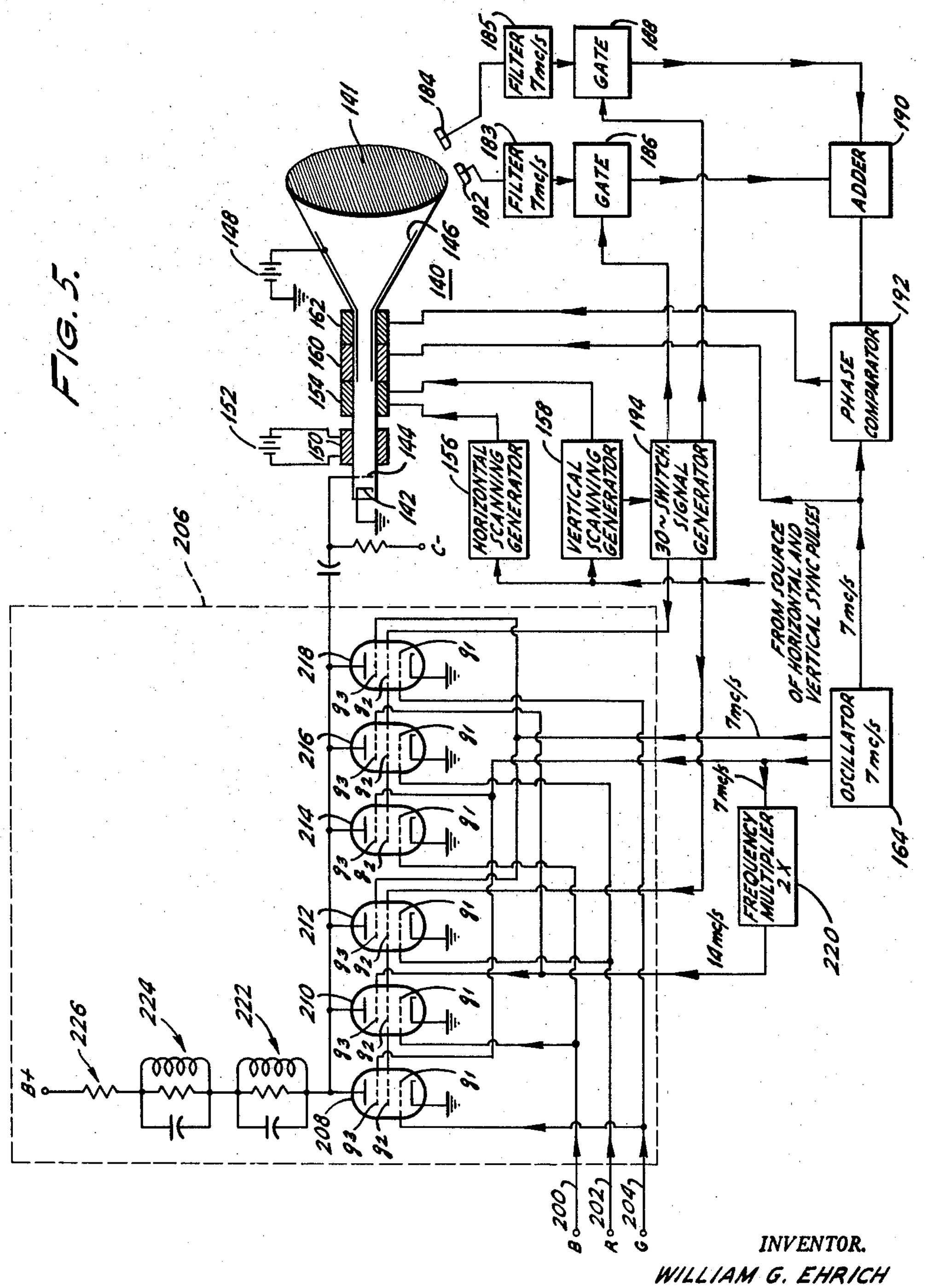
FIGURE 5 is a block diagram, partly schematic, showing a third form of a cathode-ray tube system in accordance with the invention.

In the embodiment of the invention shown in FIGURE 5, the principles of the invention have been applied to a cathode-ray tube color image reproducing system in which the image screen is energized by a single cathode-ray beam.

The system shown in FIGURE 5 comprises a cathode-ray tube 140 containing a cathode 142, a beam intensity control electrode 144 and a beam accelerating electrode 146. Electrode 144 may be operated at the desired biasing potential by means of a voltage source C— connected thereto through an appropriate grid resistor, while the anode 146 is supplied with a high positive potential from an appropriate source shown as a battery 148. A focusing coil 150, appropriately energized, for example by a battery 152, serves to focus the beam. For deflecting the beam in the horizontal and vertical directions there may be provided a deflection yoke 154 of conventional construction, which yoke is energized by horizontal and vertical scanning generators 156 and 158 respectively. There are additionally provided auxiliary vertical deflection yokes 160 and 162, which yokes serve the same functions as the yokes 36 and 38 respectively of the systems of FIGURES 1 and 5—i.e. yoke 160 serves to provide a cyclic vertical deflection of the beam, and the yoke 160 serves to produce a vertical correction deflection insuring that the beam maintains at all times the desired position of impingement on the image screen. Yoke 160 is energized by an oscillator 164 operating typically at a frequency of 7 mc./sec., whereas the yoke 162 is energized by an indexing system later to be described in detail.

Figure 6:
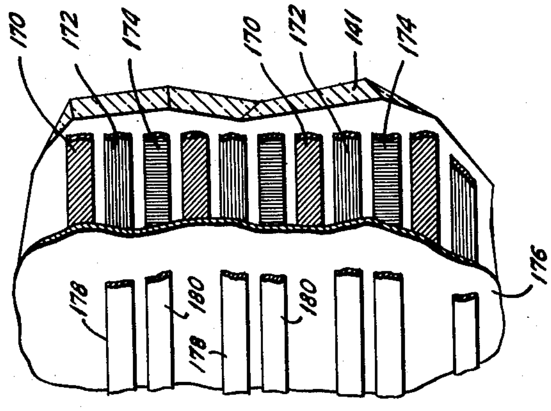
FIGURE 6 is a perspective view, partly cut away, showing a portion of one form of a beam intercepting structure for a cathode-ray tube image reproducer suitable for use in the system of FIGURE 5.

Contained within the tube 140, and arranged on the faceplate 141 thereof, is a beam intercepting image screen structure, one suitable form of which is shown in FIGURE 6. The image screen there shown comprises a plurality of parallelly arranged stripes 170, 172 and 174 of phosphor materials which fluoresce to produce light of three different primary colors—i.e. the stripe 170 is adapted to produce green light, the stripe 172 is adapted to produce blue light and the stripe 174 is adapted to produce red light. Each group of three stripes may be termed a color triplet, and the sequence of the stripes is repeated in consecutive order over the area of the faceplate 141. The phosphors constituting the stripes 170, 172 and 174 may be the same as the phosphors constituting the equivalent stripes of the image screen structure shown in FIGURE 2.

Arranged over the phosphor stripes is an electron permeable, light reflecting layer 176 which, in the specific form of the invention illustrated in FIGURE 5, serves to improve the light output of the image screen and serves as an opaque barrier preventing light from the phosphor stripes from illuminating the interior of the cathode-ray tube envelope.

The image screen structure of FIGURE 6 further serves for producing an indexing signal indicative of the position of the cathode-ray beam on the image screen. For this purpose there are provided, superimposed on the coating 176, a first series of indexing stripes 178 which are arranged in register with the phosphor stripes of one color, e.g. the blue phosphor stripes 172, and a second series of indexing stripes 180 which are arranged in register with the phosphor stripes of another color, e.g. the red phosphor stripes 174. Stripes 178 and 180 consist of different materials which, upon beam impingement, produce different responses which may be selectively detected. In the simplest form, the stripes 178 may consist of the same material as the stripes 172 so that blue light is produced thereby upon electron impingement, and the stripes 180 may consist of the same material as the stripes 174 so that red light is produced thereby upon electron impingement. It should be well understood that the stripes 178 and 180 may consist of materials other than those above described, the criterion here involved being that the response to electron impingement on the stripes 178 shall be distinguishable from the response produced by electron impingement on the stripes 180. Thus one or the other of the groups of stripes may consist of a material which produces light in the visible spectrum—i.e. red, green or blue light—and the other group of stripes may consist of a material such as zinc oxide having a spectral output in the non-visible ultra-violet light region.

Figure 7:
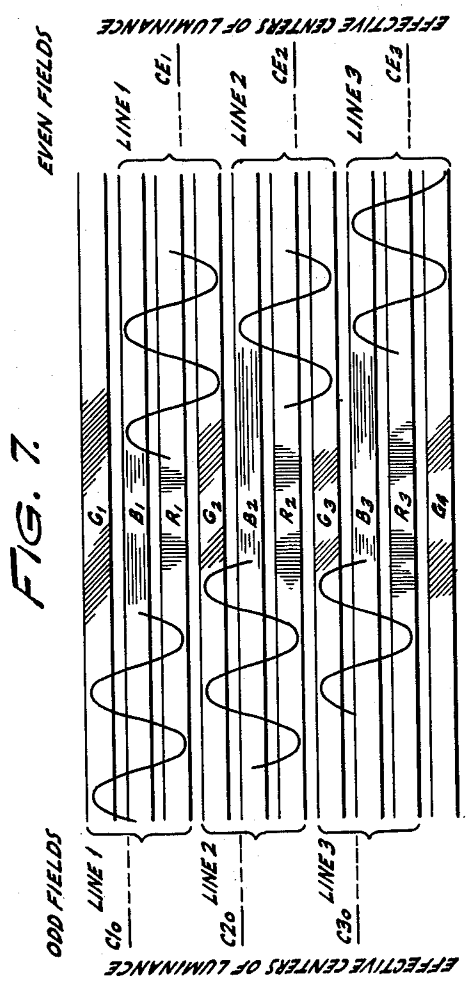
FIGURE 7 is a diagrammatic representation of the image screen of the system of FIGURE 5 showing another form of scanning pattern in accordance with the invention.

The image screen so constituted is scanned in the normal manner under the influence of the horizontal and vertical deflection signals supplied to the yoke 154 and is additionally scanned in accordance with the pattern shown in FIGURE 7 in response to the 7 mc./sec. signal supplied to the auxiliary deflection yoke 160. More particularly, and as appears from FIGURE 7, during its horizontal movement across the image screen the cathode-ray beam of tube 140 is subjected to a periodic auxiliary vertical deflection which causes the beam to impinge successively the green, blue and red phosphor stripes.

The system operates to center the auxiliary vertical deflection of the beam about the blue phosphor stripes 172 during the odd field scanning periods and to center the auxiliary vertical deflection of the beam about the red phosphor stripes 174 during the even field scanning periods. More particularly, during line 1 of the odd field scanning period, the beam successively impinges the stripes $B_1$, $G_1$, $B_1$, $R_1$, $B_1$ etc., and during the succeeding lines of this scanning period the beam successively impinges phosphor lines $B_2$, $G_2$, $B_2$, $R_2$, $B_2$, etc. and $B_3$, $G_3$, $B_3$, $R_3$, $B_3$ etc.

For the reasons previously pointed out, the scanning of the consecutive group of phosphor lines during the odd field scanning period produces a series of spaced effective centers of luminance, the positions of which are established by the relative positions of the phosphor stripes. These effective centers of luminance have been indicated at the left of FIGURE 7 as $C1_0$, $C2_0$, $C3_0$ etc. It will be noted that, whereas in FIGURE 3, the centers of luminance are positioned approximately in the center of each group of phosphor stripes, in the arrangement shown in FIGURE 7 the centers are located more nearly adjacent to the green stripes as shown because of the different distribution of the stripes in this latter arrangement.

During the even field scanning periods, the phosphor lines constituting the consecutive groups of triplets are effectively rearranged by the change of the center of movement of the beam and by the change of the scanning sequence of the phosphor lines of each group. More particularly, and as appears from the right hand side of FIGURE 7, during the even field scanning period the auxiliary vertical deflection of the beam is centered about a red phosphor line so that during line 1 the beam consecutively impinges the stripes $R_1$, $B_1$, $R_1$, $G_2$, $R_1$ etc., and during line 2 the beam successively impinges the stripes $R_2$, $B_2$, $R_2$, $G_3$, $R_2$ etc.

The scanning of the consecutive group of lines during the even field scanning period, as above described, brings about a series of spaced effective centers of luminance which have been indicated at the right of FIGURE 7 as $C1_E$, $C2_E$ etc. As will be noted these latter centers of luminance are displaced relative to the centers of luminance produced during the odd field scanning period so that, to the visual observer, the centers $C1_E$, $C2_E$ etc. are interlaced with the centers $C1_0$, $C2_0$ etc.

In order to maintain the beam centered about the blue stripes 172 during the odd field scanning periods, and about the red stripes 174 during the even field scanning periods, the system of FIGURE 5 further comprises a beam position indexing system comprising the auxiliary deflection yoke 162, two photoelectric cells 182 and 184, gating systems 186 and 188, an adder 190 and a phase comparator 192.

For the sake of clarity in the drawing, the photoelectric cells 182 and 184 have been shown to be positioned facing the image screen of the tube 140. However, it is apparent that, when using a screen structure of the type shown in FIGURE 6, the cells 182 and 184 may constitute part of the tube system—i.e. the cells may be arranged in a side wall portion of the cathode-ray tube out of the path of the cathode-ray beam and facing the inner surface of the screen of the tube. Alternatively the photocells 182 and 184 may be arranged as shown in FIGURE 5, in which case the photocells may be energized by the blue stripes 172 and the red stripes 174, whereby the stripes 178 and 180 of the screen structure shown in FIGURE 6 become unnecessary.

The photocells 182 and 184 are constructed to be selectively responsive to the emanations of the stripes 178 and 180, and this may be achieved by an appropriate selection of the response characteristics of the cells or by appropriate filters (not shown) arranged in the path of the impinging radiation. For example, when the stripe 178 consists of a phosphor which emits blue light upon electron impingement, the photocell may be made selectively responsive to this stripe by means of the blue filter arranged in the path of the light incident on the photocell. Similarly, when the stripe 180 consists of a phosphor material which emits red light upon electron impingement, the photocell 184 may be made selectively responsive to the light emitted by this stripe by means of a red filter.

The gates 186 and 188 may be conventional in form and may each consist of a dual grid thermionic tube having one grid thereof energized by one of the photocells, and having a second grid supplied with a negative biasing potential of sufficient value to produce anode current cut off. The tubes may be made selectively operative by means of an appropriate positive going signal applied to the second grid. Adder 190 may typically consist of two triode tubes having the respective grids thereof coupled to the outputs of the gates 186 and 188 and having the anodes thereof connected together through a common load impedance. The phase comparator 192 may be identical to the phase comparator 64 of the system of FIGURE 1.

For actuating the gates 186 and 188 there is provided a switching signal generator 194 which is operated at a frequency of 30 cycles per second by means of a synchronizing link to the vertical scanning generator 158. Generator 194, which may be identical to the generator 82 of the system of FIGURE 1, is adapted to apply positive going pulses to the second grids of the gates 186 and 188 in phase opposition, thereby alternately opening these gates during the consecutive field scanning periods.

The system operates to maintain the beam of the tube 140 centered on the indexing stripe 178 during one field scanning period and centered on the indexing stripe 180 during the alternate field scanning period. More specifically, during the odd field scanning periods, at which time the beam should normally be centered on the blue phosphor stripe (see FIGURE 7), the impingement of the beam on the indexing stripe 178 twice during each cycle of the auxiliary vertical deflection of the beam produces a series of pulses of blue light which recur at the rate of 14 million per second. When the auxiliary deflection of the beam is accurately centered on the indexing stripe 178, the pulses of blue light so formed will be equally spaced. However, in the event that the center of movement of the beam departs from the axis of the stripe 178, adjacent pairs of pulses will be brought closer together or spaced farther apart with the result that a 7 mc./sec. signal will be generated by the photocell 182. This 7 mc./sec. signal, which may be selectively derived from the photocell 182 by means of the filter 183 and is thereafter supplied to the gate 184, exhibits a phase polarity and amplitude as determined by the direction of the departure of the beam from its center position and by the extent of this departure.

Since, during this odd field scanning period, the beam also impinges the indexing stripe 180 in a non-symmetrical manner, a 7 mc./sec. signal is also produced by the photocell 184. The desired signal from photocell 182 is selected, by means of the gate 186 which is made conductive during the odd-field scanning period by a positive going gating signal derived from the generator 194, and is applied to the phase comparator 192. At the same time the gate 188 is maintained in a non-conductive condition by means of the negative going pulse produced by generator 194 during this interval.

The phase comparator 192 is additionally supplied with a 7 mc./sec. signal from the oscillator 164 and therefore produces at the output thereof an auxiliary deflection signal having a polarity and intensity as determined by the phase and amplitude of the indexing signal derived from the gate 186. This auxiliary deflection signal is supplied to the auxiliary deflection yoke 162 and serves to correct departures of the beam from its center position about the indexing stripe 178.

During the even field scanning periods, at which time the beam is normally centered about the indexing stripe 180, the gate 186 is made non-conductive by the change of the polarity of the switching signal from the generator 194, and the gate 188 is made conductive. Accordingly, any 7 mc./sec. signal generated by the photocell 184, as a result of departures of the center of movement of the beam from the axis of the index stripe 180, will be applied to the phase comparator 192 to the exclusion of any signals generated by photocell 182 during this period.

For producing a color image on the image screen of the cathode-ray tube 140, there are provided color signal input terminals 200, 202 and 204 which are supplied from a television receiver (not shown) with separate signals indicative of the blue, red and green components of the televised scene, respectively. The system then operates to convert these three color signals into a wave having the color information arranged in time reference sequence so that the blue information occurs when the beam impinges the blue stripes 172, the red information when the beam impinges the red stripes 174, and the green information when the beam impinges the green stripes 170. For the specific arrangement shown in FIGURE 5, the color information is supplied to the control electrode 144 of tube 140 in the sequence B G B R B G etc. during the odd field scanning periods, and in the sequence R B R G R B etc. during the even field scanning periods. For this purpose there is interposed, between the input terminals 200, 202 and 204 and the control electrode 144, a switching modulator system 206 comprising six multigrid thermionic tubes 208, 210, 212, 214, 216 and 218. Each input color component signal is supplied to a first control grid of two of the tubes—i.e. the blue input signal from terminal 200 is supplied to the control grid $g_1$ of the tubes 210 and 214, the red input signal from terminal 202 is supplied to the control grid $g_1$ of the tubes 212 and 216, and the green input signal from terminal 204 is supplied to the control grid $g_1$ of the tubes 208 and 218. The grids $g_1$ are supplied in conventional manner with a negative bias voltage which, during normal conduction of the tubes, imparts a linear operating characteristic thereto. For the sake of circuit simplification, the bias supply and its mode of application to the control grids $g_1$ are not shown.

The grids $g_2$ of the tubes 208, 210 and 212 are connected in common and supplied with a switching signal derived from the switching signal generator 194. Similarly the grids $g_2$ of the tubes 214, 216 and 218 are connected in common and supplied with a switching signal from the generator 194. These switching signals are in phase opposition so that, when the signal supplied to grids $g_2$ of tubes 208, 210 and 212 is positive going, the signal supplied to the grids $g_2$ of tubes 214, 216 and 218 is negative going. In practice the grids $g_2$ may be the screen grids of the tubes of the modulators and the switching signals may have a peak positive value equal to the normal operating screen grid voltage of the tubes. As in the case of the grids $g_1$, the D.C. paths of the grids $g_2$ are conventional and therefore have been omitted in order to avoid unnecessary complexity in the circuit diagram.

The grids $g_3$ of the tubes 208 and 214 are connected in common and supplied with a switching signal derived from the 7 mc./sec. oscillator 164, and the grids $g_3$ of the tubes 212 and 218 are connected in common and supplied with a switching signal of opposite phase derived from the oscillator 164. In addition, the grids $g_3$ of the tubes 210 and 216 are supplied with a 14 mc./sec. signal derived from oscillator 164 through a frequency doubler 220. The frequency doubler 220 may be conventional in form—i.e. it may consist of two triodes having their grids energized in phase opposition by the oscillator 164 and having their anodes connected in common to a resonant circuit broadly tuned to 14 mc./sec. The grids $g_3$ are additionally supplied with a negative biasing potential sufficient to maintain the tubes normally cut off, this potential having a value relative to the amplitude of the switching signals supplied from the oscillator 164 and from the frequency multiplier 22 so that, in the absence of other controlling factors, the tubes 208 and 214 simultaneously conduct for a 120° interval during each cycle of the voltage produced by the oscillator 164, the tubes 212 and 218 simultaneously conduct for a 120° interval during each cycle of the voltage of oscillator 164, and the tubes 210 and 216 conduct during two 60° intervals during each cycle of the oscillator voltage, the 60° conduction intervals of the tubes 210 and 216 occurring between the 120° conduction intervals of the tube pairs 208–214 and 212–218. It is believed that the method of applying the biasing potentials to the grids $g_3$ is self evident to those skilled in the art and that therefore it is unnecessary to show specific circuits of FIGURE 5 in view of the greater circuit clarity achieved by this omission.

The anodes of the tubes of the modulator system are connected in common to an anode supply B+ by means of a composite load impedance comprising a damped resonant circuit 222 broadly tuned to 14 mc./sec., a damped resonant circuit 224 broadly tuned to 7 mc./sec., and a low frequency impedance 226 which may consist of a resistor as shown.

The system operates to apply to the control electrode 140 the three color component signals at input terminals 200, 202 and 204 in a sequence and for durations as required by the scanning pattern shown in FIGURE 7. More specifically, during the odd field scanning periods, the tubes 208, 210 and 212 are made potentially conductive by means of a positive going switching signal supplied to the grids $g_2$ thereof from the generator 194, and the tubes 214, 216 and 218 are prevented from conducting by a negative going switching signal supplied to the grids $g_2$ thereof during this period.

During this scanning interval the beam is centered on the blue phosphor stripe (see FIGURE 7) so that it successively traverses the blue stripes twice during each cycle of the auxiliary vertical deflection produced by the yoke 160 and traverses the green and red stripes once during this cycle. Accordingly, in order to produce the desired energization of the phosphor stripes, the color component input signals are multiplexed in the sequence B G B R B G etc. In order to achieve this sequence, the tubes 208, 210 and 212 are selectively rendered conductive in conformity with this pattern and this is achieved by means of the switching signal supplied to the grids $g_3$ thereof. More particularly, at the instant that the beam impinges the green stripe, tube 208 is made conductive by the 7 mc. signal applied to the grid $g_3$ thereof from oscillator 164; at the instant the beam impinges the blue stripe, tube 210 is made conductive by the 14 mc./sec. signal applied to the grid $g_3$; at the instant that the beam impinges the red stripe, tube 212 is made conductive by the 7 mc./sec. signal applied to grid $g_3$; and at the instant the beam again impinges the blue stripe, tube 210 is again made conductive by the 14 mc./sec. signal applied to grid $g_3$. This sequence of operation of the tubes is repeated throughout the odd field scanning period.

During the even field scanning periods tubes 208, 210 and 212 are held cut off by the change in polarity of the switching signal from the generator 194 and the tubes 214, 216 and 218 are rendered potentially conductive by a positive going switching signal to grid $g_2$ from the generator 194.

As appears from FIGURE 7, during this latter field scanning period the sequence of scanning of the phosphor stripes follows the pattern R B R G R B etc. Accordingly, when the beam impinges the blue stripe, tube 214 is made conductive by the positive going 7 mc./sec. signal from oscillator 164; when the beam impinges the red stripe, tube 216 is made conductive by the 14 mc./sec. signal applied to grid $g_3$ and derived from the frequency multiplier 220; when the beam impinges the green stripe, tube 218 is made conductive by the 7 mc./sec. signal supplied to grid $g_3$; and when the beam again impinges the red stripe, tube 216 is again made conductive by the 14 mc./sec. signal derived from the multiplier 220. This sequence of the operation of the tubes 214, 216 and 218 is repeated throughout the even field scanning period, at the end of which period tubes 208, 210 and 212 are again rendered potentially conductive by the change in polarity of the signal applied to the grid $g_2$ thereof.

Figure 8:
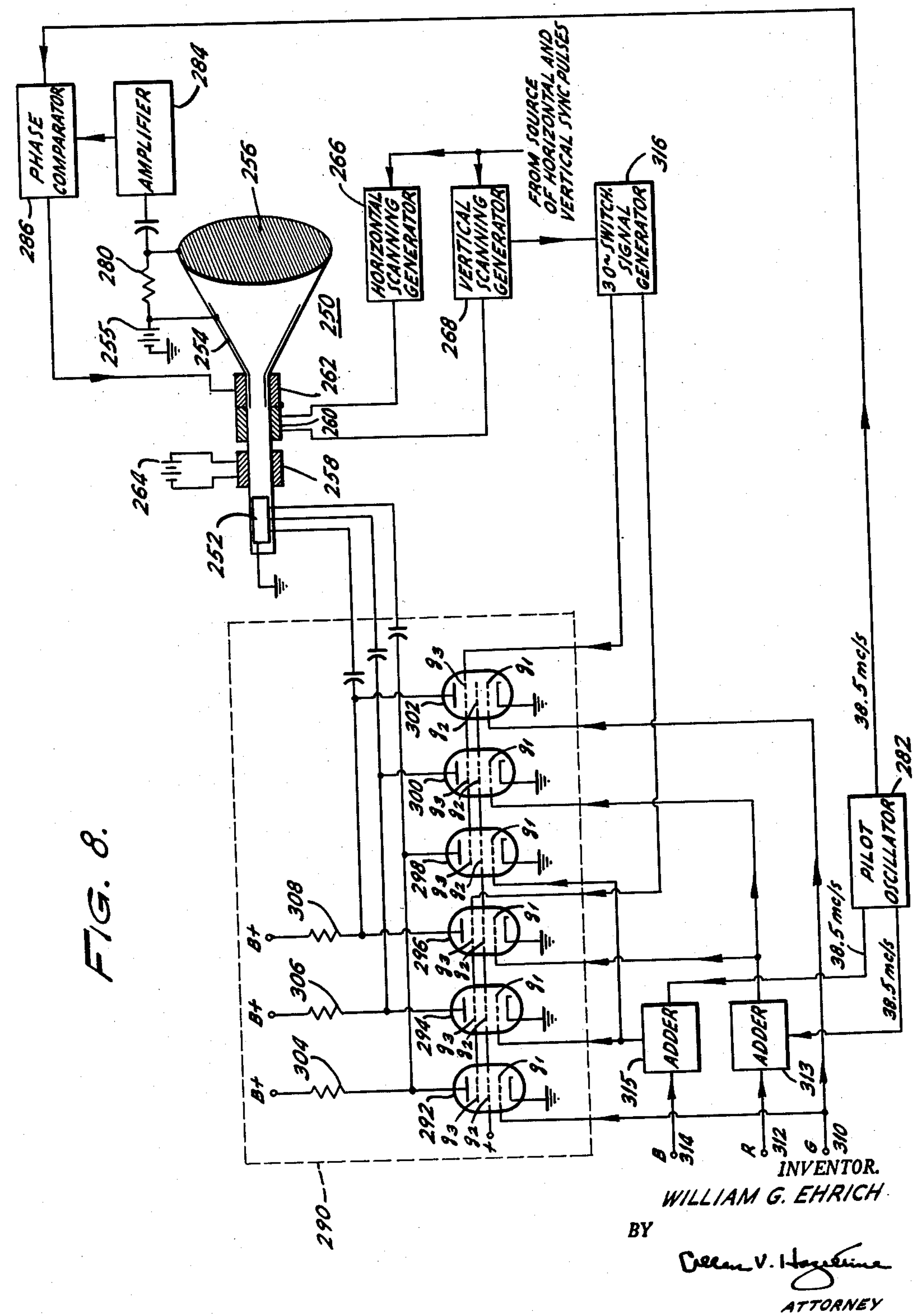
FIGURE 8 is a block diagram, partly schematic, showing another form of a cathode-ray tube system in accordance with the invention.

FIGURE 8 shows a cathode-ray tube system embodying the principles of the invention as applied to an image reproducer utilizing three scanning beams, each adapted to scan a phosphor line of a different primary color. The system there shown comprises a cathode-ray tube 250 comprising a three beam generating and intensity control system 252, an accelerating anode 254 and a face plate 256. The anode 254 is supplied with an appropriate beam accelerating potential in well known manner, for example by a battery 255. Arranged about the neck of the tube 250 is a focusing yoke 258, a deflection yoke 260 and an auxiliary vertical deflection yoke 262. The yoke 258 may be energized by a suitable source shown as a battery 264, and the yoke 260 may be energized by horizontal and vertical scanning generators 266 and 268 of conventional form.

Figure 9:
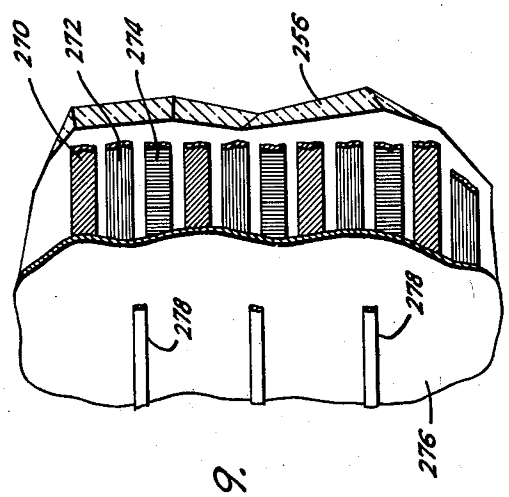
FIGURE 9 is a perspective view, partly cut away, showing a portion of a beam intercepting structure suitable for the system of FIGURE 8.

Arranged within the tube 250 is a beam intercepting image screen structure, one suitable form of which is shown in FIGURE 9. The screen structure shown in FIGURE 9 comprises horizontally arranged parallel stripes of phosphor materials adapted to produce light of three different primary colors. For example, the stripes 270 may be adapted to produce green light, stripes 272 may be adapted to produce blue light, and the stripes shown as 274 may be adapted to produce red light. Arranged over the stripes 270, 272 and 274 is an electron permeable, electrically conducting light reflecting layer 276 consisting for example of aluminum. Arranged on the coating 276, and symmetrically positioned with respect to the blue and red stripes 272 and 274, are indexing stripes 278 consisting, for example, of a material such as magnesium oxide having a secondary electron emissivity different from that of the underlying aluminum coating. The screen structure so constituted is connected to the positive pole of the battery 255 by means of an appropriate lead connected to the coating 276 and by means of a load impedance 280.

In operation, the three beams produced by the beam generating and intensity control system 252 each scan a phosphor line of a different color. In order to maintain the desired registration of the beams throughout the horizontal line scanning period, there is provided an oscillator 282 which, as is described more fully hereinafter, applies to the beam scanning the blue stripe 272 a pilot carrier signal having a relatively high frequency, e.g. 38.5 mc./sec., and also applies to the beam scanning the red stripe 274 a similar pilot carrier signal in phase opposition.

When the three beams energizing a given group of the phosphor stripes 270, 272 and 274 are accurately positioned with respect to the phosphor stripes, the pilot carrier modulated beams energizing the blue and red stripes will either straddle the indexing stripes 278 or energize the indexing stripes to the same extent so that no signal at the pilot carrier frequency will appear across the load impedance 280. However, when the beams depart from the desired register position, the indexing stripes 278 will be energized by one of the pilot carrier modulated beams to a greater extent than by the other so modulated beam, so that there is produced across the impedance 280 an indexing signal at the pilot carrier frequency having a phase and amplitude as determined by the direction and extent of the departure of the beams from the register position. This signal is supplied to an amplifier 284 and thereafter to a phase comparator 286. The amplifier 284 may be conventional in form and may contain a suitable filter for attenuating undesired signals also generated at the load impedance—i.e. a resonant circuit broadly tuned to 38.5 mc./sec. The phase comparator 286 may be constructed similarly to the phase comparator 64 of the system of FIGURE 1. By additionally energizing the phase comparator 286 by means of a signal derived from the pilot oscillator 282, at the output of the comparator there is produced at a signal having a magnitude and polarity as determined by the magnitude and phase of the indexing signal produced across the load resistor 280. This output signal is supplied to the auxiliary vertical deflection yoke 262 and serves to control the vertical position of the beams, returning the same to the desired register position.

In order to produce a change in the positions of the effective centers of luminance generated during consecutive field scanning periods, the phosphor stripes 270, 272 and 274 are energized in accordance with one group pattern during one field scanning period and are energized in accordance with a different group pattern during the successive field scanning period. More specifically, during the odd field scanning periods the phosphor stripes $G_1$, $B_1$ and $R_1$ shown in FIGURE 7 may be energized as a group by the three beams during line 1 of the scanning period, the stripes $G_2$, $B_2$ and $R_2$ may be energized as a group during line 2 of the scanning period, the stripes $G_3$, $B_3$ and $R_3$ may be energized as a group during line 3 of this scanning period, etc. During the even field scaning periods the stripes $B_1$, $R_1$ and $G_2$ may be energized as a group by the three beams during line 1 of this scanning period, the stripes $B_2$, $R_2$ and $G_3$ may be energized as a group during line 2, the stripes $B_3$, $R_3$ and $G_4$ may be energized as a group during line 3, etc.

Thus it is seen that, in the operation of the system of FIGURE 8, the phosphor stripes are scanned in different groups during the odd and even field scanning periods in the same manner as illustrated in connection with the embodiment of the invention described with reference to FIGURES 5, 6 and 7, and accordingly the effective centers of luminance produced during the odd and even scanning fields will be interlaced as shown in FIGURE 7.

To produce this desired interlacing of the effective centers of luminance in the system of FIGURE 8, the three intensity control electrodes of the multiple beam generating assembly 252 are energized in different order during the successive fields. For example, during the odd field scanning periods beam No. 1 is intensity modulated by the green color component signal, beam No. 2 is intensity modulated by the blue color component signal and beam No. 3 is intensity modulated by the red component signal. During the even field scanning period, beam No. 1 is intensity modulated by the blue component signal, beam No. 2 by the red component signal and beam No. 3 by the green component signal.

For energizing the three beams in the manner above outlined there is provided a switching modulator 290 comprising six multigrid thermionic tubes 292, 294, 296, 298, 300 and 302. As shown, tubes 292 and 298 energize beam No. 1 of the tube 250, tubes 294 and 300 energize beam No. 2, and tubes 296 and 302 energize beam No. 3, the different pairs of tubes being connected with their anodes supplied in common through load impedances 304, 306 and 308 respectively, shown as resistors. The grids $g_1$ of tubes 292 and 302 are supplied in common with the green component signal derived from an input terminal 310, the grids $g_1$ of tubes 296 and 300 are supplied in common with the red component signal derived from an input terminal 312 and supplied to the grids through an adder 313, and the grids $g_1$ of tubes 294 and 298 are supplied in common with the blue component signal derived from an input terminal 314 and supplied to these grids through an adder 315. The grids $g_1$ of tubes 296 and 300 are additionally supplied with a pilot carrier signal of one phase from the pilot oscillator 282 which is applied as a second input to the adder 313, and the grids $g_1$ of the tubes 294 and 298 are additionally supplied with a pilot carrier signal of opposite phase from the pilot oscillator 284 which is applied as a second input to the adder 315. These adders may be identical in construction to the adder 78 of the system of FIGURE 1.

The grids $g_2$ of the tubes of the switching modulator, which may be screen grids thereof, are connected in common and supplied with an appropriate positive potential.

The grids $g_3$ of the tubes of the switching modulator serve as the switching electrodes of the tubes and for this purpose the grids $g_3$ of the tubes 292, 294 and 296 are connected in common to one output terminal of a switching signal generator 316 and the grids $g_3$ of tubes 298, 300 and 302 are connected in common to the other output terminal of the generator 316. Generator 316 may be identical to the generator 82 of the system of FIGURE 1 and is adapted to produce two signals of opposite polarity having a positive going pulse duration substantially equal to the field scanning interval. The generator operates at a frequency of 30 cycles per second and is synchronized by an appropriate link to the vertical scanning generator 268.

The tubes of the switching modulator are maintained normally non-conductive by an appropriate cut-off bias voltage supplied to the grids $g_3$. Since the method of supplying such a cut-off bias to the grids $g_3$ as well as the method of supplying the usual operating bias for the tubes are conventional, these circuit details have been omitted in order to avoid unnecessarily confusing the drawing.

In operation tubes 292, 294 and 296 are rendered conductive during the odd field scanning period by the positive going switching signal supplied thereto by the generator 316 so that the three color component signals are supplied in a first order to the three intensity control electrodes of the gun assembly of the tube 250, and at the same time the pilot carrier signal is supplied in one phase to beam No. 2 and in opposite phase to beam No. 3. During the even field scanning period, these tubes are made non-conductive by the change in polarity of the switching signal from generator 316 and the tubes 298, 300 and 302 are made conductive by the positive going switching signal supplied thereto. During this latter period the three color component signals are supplied in a different order to the beam intensity control electrodes of the tube 250, and at the same time the pilot carrier signal is supplied in one phase to beam No. 1 and in opposite phase to beam No. 2 By so switching the pilot carrier signals as well as the color component signals it is insured that the beams straddling the indexing stripes 278 are in each instance supplied with pilot carrier signal of appropriate phase so that the registration system for the beams remains operative during both of the field scanning periods.

While I have described my invention by means of specific examples and in specific embodiments, I do not wish to be limited thereto for obvious modifications will occur to those skilled in the art without departing from the spirit and scope of the invention.

What I claim is:

1. Image reproducing apparatus comprising a cathode ray tube having a screen made up of a plurality of groups of horizontally oriented electron responsive strip-like elements of respectively different light-emitting characteristic and vertically spaced electron responsive beam position index signal-producing elements disposed parallel to said strip-like elements and means for producing and directing a plurality of vertically spaced electron beams toward said screen; means for causing said beams to scan said screen, as a group, in a direction parallel to said strip-like elements; and means for causing said beams to oscillate.

2. The invention as defined by claim 1 inucluding means for applying a high-frequency tag signal to one of said beams.

3. In combination: a cathode ray tube including a screen structure comprising a first group of substantially parallel, spaced apart strips of material having a predetermined response characteristic to electron impingement and a second group of substantially parallel stripes of material having a different response characteristic to electron impingement, one of said last-named stripes being disposed in each of the spaces between successive stripes of said first group, said cathode ray tube also including means for generating electrons and means for projecting said electrons toward said screen structure so that they impinge upon at least first and second areas of said screen structure separated, in a direction transverse to said parallel stripes, by substantially the distance between adjoining stripes of said first and second groups, respectively; means for deflecting said projected electrons recurrently across said screen structure in mutually perpendicular directions and at such relative velocities that, during a given deflection in one of said directions said first area of impingement traces a plurality of paths substantially coincident with successive stripes of said first group and said second area of impingement traces a plurality of paths substantially coincident with successive stripes of said second group and such that, during the next succeeding deflection in said one direction, said first area of impingement traces a plurality of parallel paths substantially coincident with successive stripes of said second group and said second area of impingement traces a plurality of paths substantially coincident with successive stripes of said first group.

4. The combination of claim 3 further characterized in that said materials constituting said first and second groups of stripes are respectively responsive to electron impingement to emit light in different colors.

5. The combination of claim 3 further characterized in that said screen structure additionally comprises a plurality of electron responsive elements having a configuration indicative of the configuration of said stripes and said combination further comprising means responsive to impingement of said electrons upon said elements for controlling the deflection of said electrons transversely of said stripes.

6. The combination of claim 5 further characterized in that said electron responsive elements are constituted of spaced stripes, paralleling the stripes of said first and second groups and constituted of material having a secondary electron emissivity substantially different from other portions of said screen structure.

7. In combination: a cathode ray tube including a screen structure comprising a first group of substantially parallel, spaced apart stripes of material having a predetermined response characteristic to electron impingement and a second group of substantially parallel stripes of material having a different response characteristic to electron impingement, one of said last-named stripes being disposed in each of the spaces between successive stripes of said first group, said cathode ray tube also including means for generating an electron beam and means for projecting said electron beam toward said screen structure; means for deflecting said electron beam cyclically in a direction transverse to said stripes and over a distance substantially equal to the distance between adjoining stripes of said first and second groups, respectively, thereby to cause said beam to impinge alternately upon first and second areas of said screen structure separated by said distance; means for deflecting said electron beam recurrently across said screen structure in mutually perpendicular directions and at such relative velocities that, during a given deflection in one of said directions, said first area of impingement traces a plurality of paths substantially coincident with successive stripes of said first group and said second area of impingement traces a plurality of paths substantially coincident with successive stripes of said second group, and such that, during the next succeeding deflection in said one direction, said first area of impingement traces a plurality of paths substantially coincident with successive stripes of said second group and said second area of impingement traces a plurality of paths substantially coincident with successive stripes of said first group.

8. In combination: a cathode ray tube including a screen structure comprising a first group of substantially parallel, spaced apart stripes of material having a predetermined response characteristic to electron impingement and a second group of substantially parallel stripes of material having a different response characteristic to electron impingement, one of said last-named stripes being disposed in each of the spaces between successive stripes of said first group, said cathode ray tube also including means for generating first and second electron beams and means for projecting said electron beams toward said screen structure so that they impinge respectively upon first and second areas of said screen structure separated by substantially the distance between adjoining stripes of said first and second groups, respectively; means for deflecting said electron beams recurrently across said screen structure in mutually perpendicular directions and at such relative velocities that, during a given deflection in one of said directions, said first area of impingement traces a plurality of paths substantially coincident with successive stripes of said first group and said second area of impingement traces a plurality of paths substantially coincident with successsive stripes of said second group and such that, during the next succeeding deflection in said one direction, said first area of impingement traces a plurality of paths substantially coincident with successive stripes of said second group and that said second area of impingement traces a plurality of paths substantially coincident with successive stripes of said first group.

9. In combination: a cathode ray tube including a screen structure comprising a first group of substantially parallel, spaced apart stripes of material having a predetermined response characteristic to electron impingement and second and third groups of substantially parallel stripes of materials having different response characteristics to electron impingement, one stripe of each of said second and third groups being disposed in each of the spaces between successive stripes of said first group, said cathode ray tube also including means for generating electrons and means for projecting said electrons toward said screen structure so that they impinge upon at least first, second and third areas of said screen structure separated, in a direction transverse to said parallel stripes, by substantially the distances between adjoining stripes of said first, second and third groups respectively; means for deflecting said projected electrons recurrently across said screen structure in mutually perpendicular directions and at such relative velocities that, during a given deflection in one of said directions, said first, second and third areas of impingement trace a plurality of paths respectively coincident with successive stripes of said first, second and third groups and, during the next succeeding deflection in said one direction, said first, second and third areas of impingement respectively trace a plurality of paths substantially coincident with successive stripes of different groups from those with which their paths are coincident during said one deflection.

10. The combination of claim 9 further characterized in that the stripes of said first, second and third groups are respectively constituted of red, green and blue light emissive phosphor materials.

11. The combination of claim 10 further characterized in that said screen structure additionally comprises an electron permeable metallic layer deposited on the interior surfaces of said stripes and a plurality of stripes disposed on the interior surface of said metallic layer, one of said last-named stripes being disposed, in alignment with each of said red stripes and being made of material having a secondary electron emissivity substantially different from that of said metallic layer.

12. Apparatus for reproducing images in color comprising in combination a first source of video signals representing a first selected component color, a second source of video signals representing a second selected component color, and a third source of signals representing a third selected component color, first and second electron guns, means for coupling the output of said first source of video signals to said first electron gun so as to intensity-modulate the beam projected by that gun, means for sequentially coupling the output of said second and third sources to said second gun so that the intensity of the beam of electrons emitted therefrom is sequentially modulated in accordance with the intensities of the second and third selected component colors, means for reproducing light of the first selected component color having an intensity corresponding to the beam of electrons projected by said first gun, and means for sequentially reproducing light of the second and third component colors in response to the beam of electrons projected by said second gun.

13. In a color television system wherein a plurality of electron beams are directed at a luminescent screen having an area with a multiplicity of substantially horizontal strips respectively capable of producing light of different component colors when excited by the electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal at the same frequency as superimposed modulation at a second phase different from the first by substantially 180° on another of the electron beams, means for generating phased error signals when the said modulated beams strike screen strips different from the strips intended for them signifying errors of registration, and means including a signal of constant phase from the pilot signal source responsive to the error signals to alter the deflection motion of the electron beams to correct errors of registration.

14. In a color television system wherein a plurality of electron beams are directed at a luminescent screen having an area with a multiplicity of substantially horizontal strips respectively capable of producing light of different component colors when excited by electron beams deflected in a manner to scan a raster on the said screen with horizontal and vertical deflection motion, a pilot signal source of specified frequency, means for applying the pilot signal as superimposed modulation at a first phase on one of the said plurality of electron beams, means for applying the same pilot signal at the same frequency as superimposed modulation at a second phase on another of the electron beams, means for generating phased error signals when the said modulated beams strike screen strips different from the strips intended for them signifying errors of registration whereby the phase of the error signals is in accordance with the direction of the errors, a phase comparator with means including a signal of constant phase responsive to the pilot signal source to convert the said phased error signals to phase demodulated signals whose polarity is in accordance with the direction of the error, and means utilizing the phase demodulated signals to superimpose deflection motion on the electron beams to correct errors of registration.

15. In a color television system according to claim 14 wherein said first and second phases differ substantially by 180°.

16. A cathode ray beam registration system for use with a color image reproducer having at least one scanning electron beam and a target area consisting of selected elemental areas of electron-sensitive material and selected areas of electron-sensitive indexing material comprising: means for deflecting the scanning electron beam along a scanning path across the target area, said scanning path consisting of a scanning path having a first prescribed direction upon which is superimposed a periodic recurrent wobble having a second prescribed direction, means for supplying color information signals to modulate the current intensity of the scanning electron beam, means for causing each of said elemental areas scanned by the cathode ray beam to be excited according to the color information signal corresponding to the elemental area impinged, means for causing the cathode ray beam to traverse and excite said prescribed selected areas of electron-sensitive indexing material at least twice during each period of said recurrent wobble to produce a train of pulses having spacings indicative of the alignment of said scanning path with respect to said selected elemental areas of electron-sensitive material, beam deflection control means responsive to the characteristics of said train of signals for producing a deflection control voltage, and means to alter the position of the cathode ray beam in a vertical direction by the deflection control voltage whereby said scanning path is maintained in a prescribed alignment.

17. A cathode ray beam registration system for use with a color image reproducer having a plurality of scanning electron beams and a target area consisting of selected elemental areas of electron-sensitive material and selected areas of electron-sensitive indexing material, comprising: means for deflecting at least one of the scanning electron beams along a path across the target area, said path consisting of a first path having a first prescribed direction upon which is superimposed a recurrent wobble having a second prescribed direction, means for supplying information signals to modulate the current intensity of selected electron beams of said plurality of electron beams, means for causing the scanning electron beam pursuing the wobble path to excite each successive elemental area traversed in the path of said recurrent wobble with current intensity according to corresponding information and to traverse said prescribed selected areas of electron-sensitive indexing material to produce a train of pulses having spacings indicative of the alignment of said scanning path with respect to said selected elemental areas of electron-sensitive material, beam deflection control means responsive to the characteristics of said train of signals for producing a deflection control voltage, and means to alter the position of said plurality of scanning electron beams in a direction normal to said first scanning path by the deflection control voltage whereby said scanning path is maintained in a prescribed alignment.

18. A cathode ray beam registration system for use with a color image reproducer having at least one scanning electron beam and a target area consisting of horizontal strips of electron-sensitive material having prescribed color light emitting characteristics, and strips of electron-sensitive indexing material, each of said strips of electron-sensitive indexing material arrayed in a prescribed alignment with a predetermined group of said strips of electron-sensitive material having prescribed color light emitting characteristics, comprising: means for deflecting the scanning electron beam along a composite scanning path across the target area consisting of a horizontal scanning path upon which is superimposed a vertically directed recurrent wobble, means for supplying color information signals to modulate the current intensity of the scanning electron beam at a prescribed sequence and rate, means for causing each of said color light emitting strips traversed by the scanning electron beam to be excited according to the information signal corresponding to the strip impinged, means for causing the scanning electron beam to traverse each strip of electron-sensitive indexing material to produce a train of pulses whose spacing between pulses is indicative of the alignment of said composite scanning path with respect to the group of color light emitting strips which is associated with that strip of electron-sensitive indexing material, beam deflection control means responsive to the spacing of said pulses for producing a deflection control voltage, and means to alter the position of the scanning electron beam in a vertical direction by the deflection control voltage whereby said composite scanning path is maintained in a prescribed alignment.

19. A cathode ray beam registration system for use with a color image reproducer having a scanning electron beam modulated by color information at a prescribed sequence and rate and a target area including groups of selected segments of cathode luminescent material, the combination of: means for deflecting said scanning electron beam over a path having a predetermined recurring vertically varying waveform during each scanning line path interval and traversing a prescribed group of said selected segments and wherein at least one of said selected segments is subjected to color information indicating electron bombardment more than once during a cycle of said predetermined waveform, said predetermined waveform having a prescribed frequency; electron beam sensitive emitting means incorporated with said group of selected segments of cathode luminescent material and bearing prescribed positioning arrangement therewith, detection means responsive to said scanning electron beam impinging on said electron beam sensitive emitting means to develop an output signal indicative of the alignment of the scanning path of said scanning electron beam relative to the group of said selected segments, a signal comparator means utilized for comparing the output signal of said detection means and the fundamental signal frequency of said predetermined waveform to develop a reference signal which is indicative of said alignment of said scanning path which said scanning electron beam pursues during a scanning line interval, and scanning beam tracking alignment control means responsive to said reference signal for control of the tracking alignment of said scanning electron beam.

20. A scanning electron beam registration system for use with a color image reproducer having a scanning electron beam and a target area including horizontally arrayed strips of selected segments of cathode luminescent color light emitting material, a source of received component color signals, means for actuating said scanning electron beam over a path having a predetermined recurring vertically directed waveform for each scanning path line interval and traversing a prescribed group of said horizontally arrayed strips of cathode luminescent material and wherein one or more of said strips is subjected to electron bombardment by said scanning electron beam more than once during a cycle of said predetermined waveform, electron beam sensitive emitting means incorporated with each prescribed group of said horizontally arrayed strips and bearing prescribed positioning arrangements therewith, detection means responsive to said scanning electron beam impinging on said electron beam sensitive emitting means to produce an output signal which is indicative of the vertical positioning of the scanning path of said scanning electron beam relative to the prescribed group of horizontally arrayed strips being traversed, a signal comparator means utilized for comparing said output signal in (sic) the fundamental signal frequency of said predetermined waveform to develop a reference signal which is indicative of the positioning of said scanning path, scanning path vertical positioning control means responsive to said reference signal for control of the vertical positioning of said scanning electron beam, sampling and synchronizing means coupled to said source of component color signals and including apparatus for deriving a sequence of component color signals with said sequence synchronized in accordance with the color of light emitted by the electron bombardment of each of said segments of said strips of cathode luminescent material which are traversed by said scanning electron beam, and means for employing said sequence of component color signals for modulating the intensity of said scanning electron beam.

21. A color television image reproduction system comprising: an image reproducing device including, a target screen made up of a plurality of horizontally oriented elements of different colored light emitting phosphors and tracking index signal producing elements, and means for producing a plurality of electron beam components; means for causing said plurality of electron beam components to scan across said target screen to produce colored light by beam impingement upon said phosphor elements and to generate index signals by beam impingement upon said index signal producing elements; means for modulating said plurality of electron beam components respectively with different color representative signals; means to determine the phase of said generated index signals; tracking circuit means associated with said image reproducing device and responsive to the phase of said generated index signals to shift the positions of said electron beam components relative to said target screen elements; and deflection means to undulate said electron beam components.

References Cited in the file of this patent

UNITED STATES PATENTS

| | | |
|---|---|---|
| 2,415,059 | Zworykin | Jan. 28, 1947 |
| 2,635,141 | Bedford | Apr. 14, 1953 |
| 2,644,855 | Bradley | July 7, 1953 |
| 2,648,722 | Bradley | Aug. 11, 1953 |
| 2,667,534 | Creamer | Jan. 26, 1954 |
| 2,671,129 | Moore | Mar. 2, 1954 |
| 2,673,890 | Moulton | Mar. 30, 1954 |
| 2,674,651 | Creamer | Apr. 6, 1954 |
| 2,827,591 | Bowie | Mar. 18, 1958 |